July 28, 1936.  G. M. PESTARINI  2,049,390

ELECTRICAL POWER SYSTEM

Filed March 13, 1935

Inventor:
Giuseppe M. Pestarini,
by Harry E. Dunham
His Attorney.

Patented July 28, 1936

2,049,390

UNITED STATES PATENT OFFICE 2,049,390

ELECTRICAL POWER SYSTEM

Giuseppe M. Pestarini, Staten Island, N. Y., assignor to General Electric Company, a corporation of New York Application March 13, 1935, Serial No. 10,920
In Great Britain March 24, 1934

8 Claims. (Cl. 172—239)

My invention relates to electrical power systems wherein a prime mover is arranged to drive a generator supplying current to an electrical load.

Electrical power systems are often used for driving self-propelled vehicles, wherein an engine drives a generator supplying power to driving motors, and another source of electrical power, such as a storage battery, is utilized for supplying additional energy to the motors during overloads and for absorbing energy from the engine driven generator when the load on the motors is removed or reduced below normal.

In apparatus of this kind, maximum efficiency is attained when the prime mover is delivering maximum power at normal speed and full throttle. Various arrangements have been proposed for utilizing the power output of an engine under light or no load conditions by charging a battery, and for utilizing this battery to aid the engine and generator during overload conditions. These arrangements generally require the use of a number of circuit changing devices to effect the proper connections under the varying load conditions.

An object of my invention is to provide an electrical power system in which a prime mover is adapted to drive a generator for supplying power to an electrical load, and wherein a dynamo-electric machine is connected in circuit with the generator and electrical load for inherently maintaining a substantially constant output on the prime mover without the use of circuit changing devices.

Further objects and advantages of my invention will become apparent in the following description, referring to the accompanying drawing, and the features of novelty which characterize my invention will be pointed out with particularity in the claims appended to and forming a part of this specification.

Figure 1:
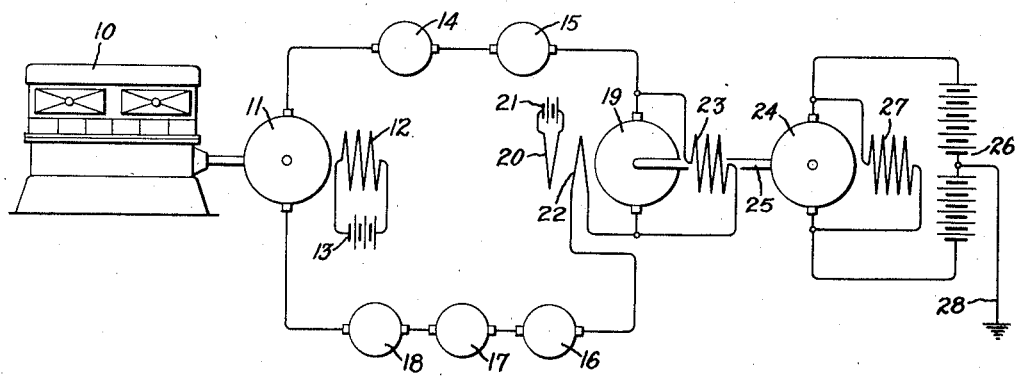
Figure 2:
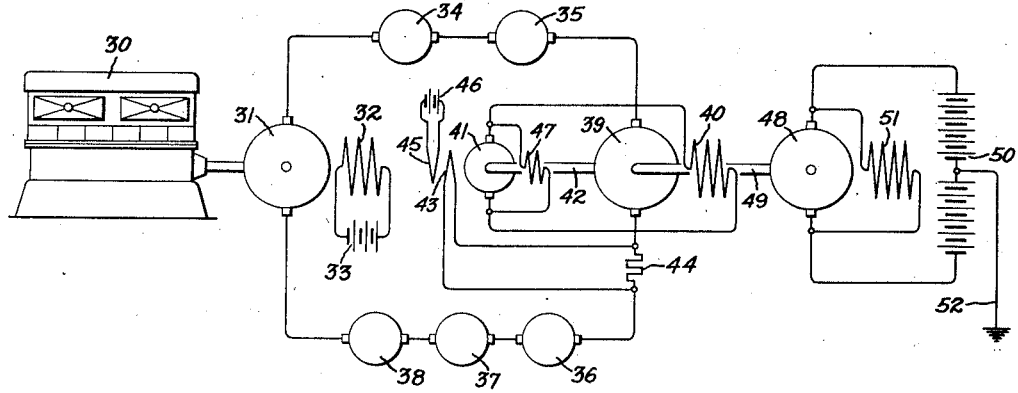

In the drawing, Fig. 1 is a schematic diagram illustrating a power system of a self-propelled vehicle embodying my invention; Fig. 2 is a schematic diagram representing a modification of the power system shown in Fig. 1.

Referring to the drawing, the power system illustrated, in Fig. 1, includes an engine 10 governed to run at substantially constant speed, or other suitable constant speed prime mover, arranged to drive a generator 11. The generator 11 is supplied with constant excitation by a field exciting winding 12, which is separately excited by a battery 13. An electrical load, such as vehicle propelling motors 14, 15, 16, 17, and 18, is connected in series with the generator 11 and with a dynamo-electric machine 19 adapted to maintain a constant current in the series circuit. This dynamo-electric machine is provided with an excitation system, including a field exciting winding 20, which is separately excited by a battery 21, or other suitable electrical source of constant potential, and by a differential field exciting winding 22, which is connected in series with the series load circuit and in opposition to the separately excited field exciting winding 20. The dynamo-electric machine 19 preferably also is provided with a shunt field exciting winding 23, connected directly across the armature of the machine, and is arranged to magnetically assist the excitation produced by the series field winding 22, thereby improving its response to variations of the load current.

The dynamo-electric machine 19 is normally driven at a constant speed by a second dynamo-electric machine 24, maintained in a predetermined speed relation thereto by a mechanical coupling 25. This second dynamo-electric machine is connected to a source of constant potential electrical power supply, such as a secondary battery 26, and is excited by a shunt field exciting winding 27, thereby providing for an inherently constant speed operating characteristic.

The excitation system of the dynamo-electric machine 19 is so arranged and proportioned that under normal operating conditions, when the electrical load utilizes substantially all the energy delivered to the series circuit by the generator 11, the resultant effect, of the three field exciting windings, is negligible, or only such as to produce a rise in potential across the armature of the machine to compensate for the resistance drop therein. If the electrical load decreases, so that the tendency is for the current in the series circuit to be reduced, the excitation provided by the series and shunt field exciting windings 22 and 23, respectively, tends to decrease and the excitation effect of the separately excited winding 20 is arranged to predominate so as to maintain constant current in the series load circuit. Accordingly, a voltage assisting that of the generator 11 will be induced within the armature of the dynamo-electric machine 19, and this machine will act as a generator driven by the constant speed dynamo-electric machine 24, supplying additional power to the series load circuit from the battery 26. If, on the other hand, the current in the load circuit increases, the excitation effect of the series and shunt field exciting windings 22 and 23, respectively, is arranged to predominate over that of the separately excited winding 20 and the dynamo-electric machine 19 will act as a motor to drive the dynamo-electric machine 24 at a speed such that the voltage induced in the latter machine becomes greater than that of the battery 26, producing a current flow in the battery circuit which recharges it, thereby, absorbing energy from the generator 11 and inherently maintaining a constant current in the series load circuit and a constant load on the engine 10.

In the modification of my invention, shown in Fig. 2, a power system is provided in which a constant speed engine 30 is arranged to drive a main generator 31 supplied with constant excitation by a field exciting winding 32 separately excited by a battery 33. An electrical load, comprising vehicle propelling motors 34, 35, 36, 37, and 38, is supplied with power by the generator 31 and connected in series with a dynamo-electric machine 39 adapted and arranged to inherently maintain constant current in the load circuit of the generator 31 and a constant load on the engine 30. This regulating dynamo-electric machine is provided with an excitation system including a field exciting winding 40 energized from an auxiliary generator, or exciter 41, which is maintained in a predetermined speed relation with the dynamo-electric machine 39 by a mechanical coupling 42. The voltage characteristic of the auxiliary generator 41 is made to be dependent upon variations in the electrical load and is inherently varied by a field exciting winding 43 connected across a shunt 44 in the series load circuit and, therefore, varies in accordance with variations in the load current. A constant component of excitation in opposition to the excitation provided by the load responsive field exciting winding 43 is supplied to the exciter 41 by another field exciting winding 45 separately excited by a battery 46. The exciter also preferably is provided with a shunt field exciting winding 47 arranged to assist the component of excitation supplied by the load current responsive field exciting winding 43, thereby, providing a more critical response to variations in the load.

Under normal conditions, the regulating dynamo-electric machine 39 is driven at a substantially constant speed by a second dynamo-electric machine 48, which is mechanically connected thereto by a coupling 49, and supplied with power by a secondary storage battery 50. This second machine preferably is arranged to have a substantially constant speed operating characteristic and it is, therefore, provided with a field exciting winding 51 connected directly across the battery 50 and the armature terminals, thereby providing a substantially constant excitation.

The excitation system of the exciter 41 is so arranged and proportioned that, under normal operating conditions, when the electrical load utilizes substantially all the energy delivered to the series circuit by the main generator 31, the resultant effect of the three field exciting windings 43, 45, and 47, is substantially zero, or only such as to supply a voltage to the dynamo-electric machine field exciting winding 40 as will induce a rise in potential within the armature of the machine 39 to compensate for the resistance drop therein due to the load current. The field exciting windings 43, 45, and 47 of the exciter 41 are so arranged that when the electrical load decreases, with a resultant tendency for the current in the series circuit to be reduced, the excitation provided by the series and shunt field exciting windings 43 and 47, respectively, tends to decrease and the excitation effect of the separately excited winding 45 will predominate. The dynamo-electric machine field exciting winding 40 is thereby energized in such manner that a voltage is induced in the armature of the dynamo-electric machine 39 assisting the voltage impressed upon the load circuit by the main generator 31, so as to maintain constant current in the load circuit and constant load on the engine. On the other hand, if the load is increased, the excitation effect of the series and shunt field exciting windings 43 and 47, respectively, will predominate over that of the separately excited field exciting winding 45. The resultant voltage impressed on the dynamo-electric machine field exciting winding 40, by the exciter 41, will be such that the energization of this field exciting winding will produce an excitation of the dynamo-electric machine 39 causing it to act as a motor. Under this condition, the second dynamo-electric machine 48 is driven thereby at a speed such that the voltage induced in this latter machine causes a reversal of current to flow in the battery circuit. This recharges the battery 50 absorbing energy from the main generator 31 and inherently maintains a constant current in the load circuit of the generator 31 and a constant load on the engine 30.

In either of the embodiments of my invention, it is preferable to ground the mid-point of the secondary battery, as indicated at 28 and 52, so that the voltage between ground and any point in the system will be minimized and the possibility of injury, resulting from high potentials, will be greatly reduced.

In view of the foregoing description, it will be seen that I have provided a power system in which a prime mover is arranged to drive a generator supplying power to an electrical load, wherein the net load upon the prime mover is inherently maintained constant under varying load demands, without the use of circuit changing devices.

Modifications of the circuit arrangements, which I have described, as employed in my improved system, will occur to those skilled in the art. I desire it to be understood, therefore, that my invention is not to be limited to the particular embodiments thereof set forth and I intend, in the appended claims, to cover all modifications which do not depart from the spirit and scope of my invention.

What I claim as new and desire to secure by Letters Patent of the United States, is:—

1. A power system including a prime mover and a generator driven thereby, an electrical load, means for connecting said generator and said electrical load in series circuit relation, a dynamo-electric machine connected in said series circuit, a source of electrical power supply, a second dynamo-electric machine, means for connecting said second dynamo-electric machine to said source of electrical power supply, means for mechanically connecting said dynamo-electric machines, and means utilizing said dynamo-electric machines for transferring power between said generator and said source of electrical power supply and for maintaining substantially constant load on said prime mover.

2. A power system including a constant speed prime mover and a generator driven thereby, means for supplying constant excitation to said generator, an electrical load, means for connecting said generator and said electrical load in series circuit relation, a dynamo-electric machine connected in said series circuit, a source of electrical power supply, a second dynamo-electric machine, means for connecting said second dynamo-electric machine to said source of electrical power supply, means for mechanically connecting said dynamo-electric machines, and means including said dynamo-electric machines and a field exciting winding for said first mentioned dynamo-electric machine for maintaining a substantially constant current in said series circuit and for maintaining substantially constant load on said prime mover.

3. A power system including an engine and a generator driven thereby, an electrical load, means for connecting said generator, and said electrical load in series circuit relation, a dynamo-electric machine connected in said series circuit, means dependent upon variations in said electrical load for supplying a variable excitation to said dynamo-electric machine, a source of electrical power supply, a second dynamo-electric machine, means connecting said second dynamo-electric machine to said source of electrical power supply, means for maintaining a predetermined speed relation between said dynamo-electric machines, and means utilizing said dynamo-electric machines for transferring power between said generator and said source of electrical power supply and for maintaining substantially constant load on said engine.

4. A power system including a constant speed prime mover and a generator driven thereby, means for supplying constant excitation to said generator, an electrical load, means for connecting said generator and said electrical load in series circuit relation, a dynamo-electric machine connected in said series circuit, means including a field exciting winding for supplying a constant component of excitation to said dynamo-electric machine, means including a second field exciting winding connected in said series circuit for supplying a component of excitation to said dynamo-electric machine in opposition to the excitation of said first mentioned field exciting winding, and means utilizing said dynamo-electric machine field exciting windings for maintaining substantially constant current in said series circuit and for maintaining substantially constant load on said prime mover.

5. A power system including a constant speed prime mover and a generator driven thereby, means for supplying constant excitation to said generator, an electrical load, means for connecting said generator and said electrical load in series circuit relation, a dynamo-electric machine connected in said series circuit, means including a field exciting winding for supplying a component of constant excitation to said dynamo-electric machine, means including a second field exciting winding connected in said series circuit for supplying a variable component of excitation to said dynamo-electric machine in opposition to that of said first mentioned field exciting winding, a third field exciting winding for said dynamo-electric machine, means providing a variable excitation of said third field exciting winding in accordance with the voltage across said dynamo-electric machine, a source of electrical power supply, a second dynamo-electric machine, means for connecting said second dynamo-electric machine to said source of electrical power supply, means for driving said dynamo-electric machines in a predetermined speed relation, and means utilizing said field exciting windings and said dynamo-electric machines for transferring power between said generator and said source of electrical power supply for maintaining substantially constant current in said series circuit and for maintaining substantially constant load on said prime mover.

6. A power system including a prime mover and a main generator driven thereby, an electrical load, means for connecting said generator and said electrical load in series circuit relation, a dynamo-electric machine connected in said series circuit, an excitation system for said dynamo-electric machine including an auxiliary generator, means for driving said auxiliary generator in a predetermined speed relation to said dynamo-electric machine, means including a field exciting winding for supplying a constant component of excitation to said auxiliary generator, means including a second field exciting winding for supplying a variable component of excitation to said auxiliary generator in opposition to said first mentioned field exciting winding, said last mentioned means being dependent upon variations of the current in said series circuit, a field exciting winding for said dynamo-electric machine, means for connecting said dynamo-electric machine field exciting winding to said auxiliary generator, a source of electrical power supply, and means including a second dynamo-electric machine arranged to transfer power between said first mentioned dynamo-electric machine and said source of electrical power supply for maintaining substantially constant load on said prime mover.

7. A power system including a prime mover and a main generator driven thereby, an electrical load, means for connecting said generator and said electrical load in series circuit relation, a dynamo-electric machine connected in said series circuit, an excitation system for said dynamo-electric machine including a field exciting winding and an auxiliary generator, means for driving said auxiliary generator in a predetermined speed relation to said dynamo-electric machine, means including a field exciting winding for supplying a constant component of excitation to said auxiliary generator, means including a second field exciting winding for supplying a variable component of excitation to said auxiliary generator in accordance with variations of the load current in said series circuit and in opposition to said first mentioned field exciting winding, a source of electrical power supply, a second dynamo-machine, means for connecting said second dynamo-electric machine to said source of electrical power supply, means for maintaining a predetermined speed relation between said dynamo-electric machines, and means utilizing said dynamo-electric machines for transferring power between said main generator and said source of electrical power supply and for maintaining substantially constant load on said prime mover.

8. A vehicle driving apparatus including a prime mover, a generator driven by said prime mover, means for supplying constant excitation to said generator, an electrical load including vehicle driving motors, means for connecting said generator and said electrical load in series circuit relation, a dynamo-electric machine connected in said series circuit, means including a field exciting winding for supplying a constant component of excitation to said dynamo-electric machine, means including a second field exciting winding connected in said series circuit for supplying a variable component of excitation to said dynamo-electric machine in opposition to said first mentioned field exciting winding and in accordance with current variations in said series circuit, means including a third field exciting winding for providing a variable component of excitation to said dynamo-electric machine in accordance with the voltage across said dynamo-electric machine, a battery, a second dynamo-electric machine, means for connecting said second dynamo-electric machine to said battery, means for driving said dynamo-electric machines in a predetermined speed relation, and means utilizing said dynamo-electric machines for transferring power between said generator and said battery for maintaining substantially constant current in said series circuit and for maintaining substantially constant load on said prime mover.

GIUSEPPE MASSIMO PESTARINI.

CERTIFICATE OF CORRECTION.

Patent No. 2,049,390.  July 28, 1936.

GIUSEPPE M. PESTARINI.

It is hereby certified that error appears in the printed specification of the above numbered patent requiring correction as follows: Page 3, second column, line 52-53, claim 7, after the word and hyphen, "dynamo-" insert electric; and that the said Letters Patent should be read with this correction therein that the same may conform to the record of the case in the Patent Office.

Signed and sealed this 29th day of September, A. D. 1936.

Henry Van Arsdale (Seal)  Acting Commissioner of Patents.